United States Patent
Wu

(10) Patent No.: US 8,088,491 B2
(45) Date of Patent: Jan. 3, 2012

(54) FLUOROCHLORO IONOMERS

(76) Inventor: Huey-Shen Wu, Taipei (TW)

( * ) Notice: Subject to any disclaimer, the term of this patent is extended or adjusted under 35 U.S.C. 154(b) by 1090 days.

(21) Appl. No.: 11/894,061

(22) Filed: Aug. 20, 2007

(65) Prior Publication Data

US 2009/0053576 A1 Feb. 26, 2009

(51) Int. Cl.
*B32B 27/06* (2006.01)
(52) U.S. Cl. .......................................... 428/422
(58) Field of Classification Search .................. None
See application file for complete search history.

(56) References Cited

U.S. PATENT DOCUMENTS

2005/0209421 A1* 9/2005 Hoshi et al. ................. 526/250

* cited by examiner

*Primary Examiner* — Ramsey Zacharia

(57) ABSTRACT

This invention discloses novel fluorochloro ionomers and processes of making them. The first preferred body of invention is perfluorochloro ionomers having (1) equivalent weight between 600 and 1500, preferably between 800 and 1200, and most preferably between 900 and 1100; (2) chlorine content between 8% and 30% by weight. These ionomers are breathable and excellent barrier materials, capable of being processed into thin films or membranes and are well suited for low humidity or high temperature fuel cell applications and for chemical protective covering materials. The second preferred body of invention is partially fluorochloro ionomers having (1) moisture vapor permeability rate>3000 gram $H_2O$/ $m^2$/day (about ½ mil thick film); (2) chlorine content of between 10% and 39% by weight. These ionomers are breathable and excellent barrier materials that can also be processed into thin films or membranes and are suited for some fuel cell applications and more preferably for breathable protective covering applications. The membranes can be monolithic films or multi-layers films, or composite films, or bipolar membranes. These novel fluorochloro ionomers are made by radical copolymerization of at least one fluorochloro monomer and at least one comonomer consisting of at least ionic group or at least one precursor that can be converted to ionic groups such as acid groups or amines or quaternary amine groups. The said fluorochloro monomer containing at least one fluorine and at least one chlorine atom is free radical polymerizable including chlorotrifluoroethylene ($CFCl=CF_2$) and dichlorodifluoroethylene ($CFCl=CFCl$).

2 Claims, No Drawings

FLUOROCHLORO IONOMERS

FIELD OF THE INVENTION

This invention relates to fluorochloro ionomers, and specifically to fluorochloro ionomers of high ionic conductivity, low methanol crossover rate, relatively low hydration and that can be processed into thin films. The fluorochloro ionomers are preferably fluorochloro compounds suitable for applications where reasonably high ionic conductivity in low humidity environments and good barrier properties at high humidity is desirable. One major application is in solid polymer electrolyte fuel cells. Another major application is for protective covering against noxious liquids and gases.

BACKGROUND OF THE INVENTION

The concept of using an ion-exchange membrane as an electrolyte separator for polymer electrolyte membrane (PEM) fuel cells was first introduced by General Electric in 1955. However, a real breakthrough in PEM fuel cell technology occurred in the mid-1960s, after DuPont introduced Nafion® membrane, a perfluorosulfonic acid (PFSA) membrane. Due to their inherent chemical, thermal, and oxidative stability, perfluorosulfonic acid membranes displaced unstable polystyrene sulfonic acid membranes. Even today, Nafion® membranes and other related perfluorosulfonic acid membranes are considered to be the state of the art for PEM fuel cell technology. Although perfluorosulfonic acid membrane structures are preferred, structural improvements are still needed to accommodate the increasing demands of fuel cell systems for specific applications. Higher performance, lower cost, greater durability, better water management, the capability to perform at higher temperatures, and flexibility in operating with a wide range of fuels are some of the challenges that need to be overcome before widespread commercial adoption of the technology can be implemented.

The membrane electrolyte in PEM fuel cells plays two critical roles: effectively separating both fuel and oxidant, preventing mixing; and transporting protons from the anode to the cathode to complete the redox reaction chemistry. This means that the membrane electrolyte should provide strong mechanical, chemical, and electrochemical stability and low gas permeability over a wide range of operating conditions. In addition, membranes are required to have high proton conductivity at low to medium temperatures (sub-zero to 90° C.). Usually, an ionic conductivity of 90-100 mS/cm is an acceptable and useful range for several applications in the portable, stationary, and mobile classifications, with membrane thicknesses ranging from 20 micron to 200 micron. Thicker membranes are currently preferred, due to the desire for less fuel crossover (in portable applications) and greater durability over 40,000 hours (in stationary applications). Transportation applications require thinner membranes to achieve higher power density with a durability of over 5000 hours. Today, PFSA membranes are the membranes of choice for PEM fuel cell systems, since their robustness, durability, and well-balanced physicochemical properties top general PEM requirements. Among the known PEM membranes (fluorinated and non-fluorinated), Nafion® membrane has been considered the benchmark material against which most results are compared.

The development of PFSA membranes has a long and rich history dating to the discovery of poly(tetrafluoroethylene) (PTFE) in 1938. Nafion® membrane was originally developed for chlor-alkali applications in early 1962, and later the functional group of the side chain was modified from a weaker acid to a stronger acid to suit fuel cell applications. As mentioned earlier, its first use in a fuel cell was in 1966 with its successful demonstration in NASA's space program.

Nafion® resin is a copolymer of TFE (tetrafluoroethylene) and vinyl ether [perfluoro (4-methyl-3,6-dioxa-7-octene-1-sulfonyl fluoride)] (PSEPVE). Its chemical structure in non-ionic form is shown in Structure 1. Upon further chemical treatment with a base, followed by an acid, the polymer is converted from a non-conducting film (—$SO_2F$ form) to a highly conducting (—$SO_3H$ form) ionomer membrane.

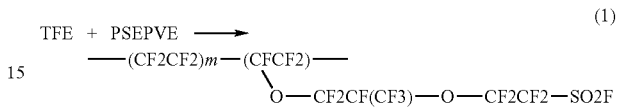
(1)

(m is about 3-11, depending upon various grades.)

After hydrolysis by a base and acidification by an acid, it becomes

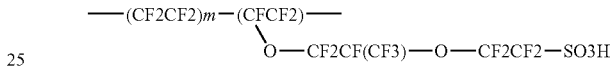

The perfluorinated backbone (PTFE like) imparts superior chemical and thermal stability to non-fluorinated polymers. The pendant sulfonic acid (—$SO_3H$) group imparts super acidic characteristics for facile proton transport. The acid capacity or membrane equivalent weight (EW), of the membrane is determined by the composition of the vinyl ether and can be typically produced from 0.67-1.25 milli-equivalents per gram, corresponding to 1500-800 EW. The proton conductivity of the membrane is strongly dependent on the water content in the membrane structure. The acid capacity strongly affects the water uptake; therefore, the conductivity of the final membrane, as shown in Table I (published in WO 00/52060 PCT Patent application). An EW range from 800-1100 is preferred for all the practical fuel cell applications considered today because it produces the maximum ionic conductivity.

TABLE I

Water Uptake and Ionic Conductivity for Nafion ® Membranes

| Equivalent Weight (g/eq) | Water Uptake (wt %) | Ionic Conductivity at 23° C. (S/cm) |
|---|---|---|
| 1500 | 13.3 | 0.0123 |
| 1350 | 19.4 | 0.0253 |
| 1200 | 21.0 | 0.0636 |
| 1100 | 25.0 | 0.0902 |
| 980 | 27.1 | 0.1193 |
| 834 | 53.1 | 0.1152 |
| 785 | 79.1 | 0.0791 |

The successful demonstration of PEM fuel cell operation with Nafion® membranes has stimulated other fluoropolymer producers to develop stable PFSA membrane structures. Asahi Kasei Corp. (formerly Asahi Chemical), Asahi Glass Co., and Dow Chemical Co. introduced Aciplex®, Flemion®, and Dow membranes, respectively. A chemically inert PTFE like backbone is common to all of these membranes; however, their side-chain structures are slightly different, as described in Table II. All of the membranes currently available in the commercial market except the Dow membrane, which is no longer offered.

TABLE II

Typical Functional Monomers of Perfluorosulfonic Acid Membranes

| Membrane Type | Monomer Structure |
| --- | --- |
| Nafion ®, Flemion ® | CF2=CFO—CF2CF(CF3)—O—CF2CF2—SO2F |
| Aciplex ® | CF2=CFO—CF2CF(CF3)—O—CF2CF2CF2—SO2F |
| Dow | CF2=CFO—CF2CF2—SO2F |

Membranes based on neat PFSA ionomer have a tendency to swell undesirably when exposed to water, leading to poor handling and mechanical properties. This issue becomes more severe with thinner membrane structures, especially at elevated temperatures. In the early 1980s, reinforcement technologies were developed to improve the mechanical stability and durability of perfluorinated membranes, aiming at chlor-alkali electrolysis applications. PTFE-based woven fabrics and micro fibrils were widely used for reinforcement, for their chemical inertness and excellent compatibility with fluorinated ionomer structures. In 1995, W.L. Gore & Associates introduced the Gore-Select membrane, which is a micro-reinforced composite structure of expanded PTFE and perfluorosulfonic acid ionomer. A more robust and thinner membrane, as thin as 5 micron, was produced by this technique, allowing the fuel cell to achieve high power without sacrificing longevity and durability. Alternatively, Asahi Glass Co. introduced a thin, flat PTFE fibril-reinforced PFSA membrane with good mechanical strength and performance. A continuous-film production facility has been established that uses a newly developed process.

In addition, a large number of research groups are actively engaged in modifying existing PFSA membrane structures to further improve membrane functionality and durability while retaining the base membrane properties. Both physical and chemical modifications have been explored. These include impregnation of PFSA membranes with phosphoric and sulfuric acids; inorganic materials, namely, zirconium (hydrogen) phosphate and silica; and the development of blend composite membranes such as ionically cross-linked acid-base membranes, PFSA/polybenzimidazole, and perfluorinated composite membrane structures.

The instant invention relates to fluorochloro ionomers made from copolymerization of fluorochloro monomers, which form polymeric backbone, and comonomers consisting of ionic groups or precursors which can be converted to ionic groups such as acid groups or amines or quaternary amine groups. The said fluorochloro monomers are preferably perfluorochloroethyelene. Good examples include chlorotrifluoroethylene (CFCl=CF$_2$) and dichlorodifluoroethylene (CFCl=CFCl) and the like. Chlorotrifluoroethylene is most preferred, because of its ease and safe of handling far superior to tetrafluoroethylene which is dangerously explosive. Furthermore, poly(chlorotrifluoroethylene) PCTFE has been demonstrated as the best barrier polymer against permeation of organics including methanol, far better than any known perfluorinated polymers. In fact, the barrier properties of PCTFE are 10 to 100 times better than those of PTFE or FEP for oxygen, CO$_2$ and HCl. The most famous brand of such PCTFE barrier membrane has been Honeywell (now GE Plastics) Aclon® barrier membrane, wherein oxygen, moisture and organics all have the lowest crossover rate compared to any known plastic films. It is quite unexpected that a membrane electrolyte based on PCTFE backbone could exhibit superior barrier property against methanol crossover than PTFE backbone. Furthermore, PCTFE has also been demonstrated far stronger than PTFE in mechanical strength, which is also critical for control of undesirable membrane swollen with better water management. The combination of fluorine and chlorine in the polymeric backbone makes surprising improvement over PFSA ionomers and other ionomers. PCTFE maintains its useful service temperatures over a very broad temperature range (−100° C. to 200° C.). PCTFE has comparable mechanical strength and durability to Nylon and possesses excellent impact resistance at ambient and sub-ambient temperature. PCTFE also possesses low flame spread and low smoke generation characteristics.

| Gas Permeability of PCTFE v. FEP (PTFE like) Films | | | | |
| --- | --- | --- | --- | --- |
| Film Type (1 mm) | Moisture | O2 | N2 | CO2 |
| PCTFE | 0.171 | 0.47 | 0.17 | 1.1 |
| FEP | 2.75-3.44 | 50-70 | 20-27 | 110-190 |

Moisture unit: kg/m$^2$ · hr
O2, N2, CO2: m$^3$ · mm/m$^2$ MPa

Direct methanol fuel cells (DMFC) offer high energy, compact power that is required to power numerous electronic devices for extended mission times. DMFC technology would benefit greatly with the advent of a PEM that maintains high proton conductivity under conditions of low humidity while also inhibiting methanol permeability. Swelling of the PEM due to high solvent uptake can compromise mechanical integrity and promote methanol diffusion through the membrane. A PEM that is a good proton conductor under conditions of low humidity would help to minimize these effects. Our PCTFE based polymer electrolytes unexpectedly have the advantage of improved internal water management and ion conductivity and reduced methanol crossover. Internal water balance within the PCTFE based polymer electrolyte membrane could enhance water management, and alleviate the need to recycle water formed at the cathode.

As used herein the acid form of an ionomer means that substantially all the ion exchange groups, e.g., —SO$_3$H sulfonic groups, —COOH carboxylic acid groups, and phosphonic acid groups are protonated. One important parameter used to characterize ionomers is the equivalent weight. Within this application, the equivalent weight (EW) is defined to be the weight of the polymer in acid form required to neutralize one equivalent of NaOH. Lower EW means that there are more active ionic species (e.g., protons) present. If it takes more NaOH to neutralize the ionomers, there must be more active ionic species within the polymer. Because the ionic conductivity is generally proportional to the number of active ionic species in the polymer, one would therefore like to lower the EW in order to increase conductivity.

Lowering the equivalent weight has previously not been a very successful approach to making useful membranes, due to the physical weakness of tetrafluoroethylene backbone of current PSFA ionomers. As the equivalent weight goes down, the amount of water (or solvent) that the polymer absorbs goes up. The amount of water absorbed by the polymer is called the degree of hydration or hydration. It is expressed as the weight percent of water absorbed by the polymer after immersion in room temperature water for such as two hours. A higher degree of hydration is desirable up to a point because it tends to increase the ionic conductivity of the membrane. Correspondingly, lowering the degree of hydration has traditionally meant decreasing the conductivity. But there is a limit to the amount of water or solvent such that PFSA ionomer membranes can contain. If too much water is present, the film may lose much of its physical integrity, becoming gel-like with little rigidity and may completely disintegrate. In addition, depending on the polymer composition, low EW PFSA ionomers may even partially or completely dissolve in water. Furthermore, even if the films were mechanically stable, too high a hydration would tend to dilute the number of ions present for conduction, thereby lowering the ionic conductivity. Thus, there is an optimal degree of hydration that is high enough to provide the highest conductivity, while not so high that the films become mechanically unstable when hydrated.

Various approaches have been used to improve this limitation. In U.S. Pat. Nos. 5,654,109, 5,246,792, 5,981,097, 6,156,451, and 5,082,472, various forms of composite membranes were mentioned. Although each of these approaches may offer some improvement over a monolithic single layer PFSA ionomer membrane, they all involve the use of rather complex, composite, multilayer structures that are difficult and expensive to process. Our invented fluorochloro ionomers surprisingly improves the problem perhaps due to mechanically stronger fluorochloro polymeric backbone and low swelling when hydrated.

Fluoropolymer ionically conducting membranes have been utilized in many different applications. One application that has been widely used is as chlor-alkali electrolytic cell membranes for the electrolysis of sodium chloride, for example, in U.S. Pat. Nos. 4,358,545, 4,417,969, 4,478,695 and 6,156,451. Additionally, this generic class of polymers, described as fluoropolymer ionomers, has been proposed for use as coatings as described in U.S. Pat. No. 4,661,411; as wire insulation such as in WO 90/15828; as replacements for acid catalysts, primarily in organic synthesis as described in "Perfluorinated Resin sulfonic Acid (Nafion-H®) Catalysis in Synthesis", by Olah, G. A., Iyer P. S, and Surya P. G. K., in Journal: Synthesis (Stuttgart), 1986 (7) 513 531, and in "Perfluorinated Resin sulfonic acid (Nafion-H) Catalysis in Organic Synthesis" by Yamato, T., in Yuki Gosei Kagaku Kyokaishi/Journal of Synthetic Organic Chemistry, volume 53, number 6, June 1995, p 487 499; as a membrane for water electrolysis as described in Yen, R. S., McBreen, J., Kissel, G., Kulesa, F. and Srinivasan, S. in the Journal of Applied Electrochemistry, volume 10, pg. 741, 1980; as a membrane for electrowinning as described, for example, in "The Use of Nation-415 Membrane in Copper Electrowinning from Chloride Solution" by Raudsepp, R., and Vreugde, M., in CIM Bulletin, 1982, V75, N842, P122; as a tube to continuously and very selectively dry wet gas streams (see product literature from Perma Pure, Inc., Toms River, N.J.); in metal ion recovery systems as described in product literature of Nafion® perfluorinated membrane case histories, DuPont Company, Polymer Products Department, Wilmington, Del. 19898; and as components in polymer electrolyte membrane (PEM) fuel cells. In the latter case, they can function both as the electrolyte or a component thereof, for example as described in by Bahar et. al. in U.S. Pat. Nos. 5,547,551 and 5,599,614; and/or as a component in one or both of the electrodes of the MEA. DuPont Nafion® perfluoro ionomer films have also been demonstrated as a good barrier to chemical agents (U.S. Pat. No. 4,515,761); however, it has not been commercial for protective covering application due to its extremely high cost.

When ionomers (ion conducting polymers) are used as the electrolyte in PEM fuel cells, they conduct protons from one electrode to the other. A common problem associated with such fuel cells is that contaminants such as carbon monoxide tend to poison the catalysts used in the MEA. These contaminants can interfere with the flow of ions between the electrodes and thus degrade the performance of the fuel cell. One way to reduce the effect of carbon monoxide is to operate the fuel cell at an elevated temperature. This reduces the formation and/or increases the destruction rate of potential contaminants and thereby allows more efficient electrode performance. The problem with running at high temperatures, however, is that it vaporizes liquid water within the fuel cell, and in so doing, tends to reduce the degree of hydration in the membrane. As described above, decreasing the hydration lowers the ionic conductivity, thereby reducing the efficiency of ion transport through the membrane and adversely affecting fuel cell operation. In fact, at lower temperatures, in PEM fuel cells using conventional ionomers, the incoming gas streams are usually well-humidified in order to maintain a relatively high degree of hydration. Only by adding the additional water in the form of humidity in the gases can the hydration be kept high enough to allow efficient fuel cell operation for long period of time. However, as the temperature gets close to, or above, the boiling point of water this approach becomes difficult and ineffective. Thus, an ionomer with relatively low hydration and acceptably high ionic conductivity would require less ambient water to function as the electrolyte in PEM fuel cells. It could function efficiently both in lower humidity environments at lower temperatures, as well as at temperatures closer to and even potentially above the boiling point of water.

Against this background of conventional wisdom, applicant has discovered fluorochloro ionomers that have a combination of relatively high ionic conductivity and relatively low hydration, and excellent barrier against permeation of organics including methanol crossover. As a result, this invention makes possible the more effective use of solid polymer electrolyte membranes in existing applications such as those described above. Additionally, new applications heretofore not practical may become possible with this new, unique set of characteristics. The instant invention is particularly valuable as an electrolyte or component thereof, or as a component in the electrode of polymer electrolyte membrane fuel cells operating at high temperature or low humidity as well as breathable protective covering industry.

SUMMARY OF THE INVENTION

This invention covers fluorochloro ionomers and processes of making them. The first embodiment of the invention is perfluorochloro ionomers having (1) equivalent weight between 600 and 1500, preferably between 800 and 1200, and most preferably between 900 and 1100; (2) chlorine content between 8% and 30% by weight. The chlorine content can be determined by elemental analysis. These ionomers are capable of being processed into thin films or membranes (from 5 micrometer thick to 200 micrometer) and are extremely well suited for low humidity or high temperature fuel cell applications and for chemical protective covering materials. The second embodiment of the invention is partially fluorochloro ionomers having (1) moisture vapor permeability rate>3000 gram $H_2O/m^2$/day (about ½ mil thick film); (2) chlorine content of between 10% and 39% by weight. These ionomers can be processed into thin films or membranes (from 5 micrometer thick to 200 micrometer) and are suited for some fuel cell applications and more preferably for breathable protective covering materials. The third embodiment of the invention is process of producing these fluorochloro ionomers by radical copolymerization of at least one fluorochloro monomer and at least one comonomer consisting of ionic groups or precursors that can be converted to ionic groups such as acid groups or amines or quaternary amine groups. The said fluorochloro monomer containing at least one fluorine and at least one chlorine atom is free radical polymerizable, including but not limited to chlorotrifluoroethylene (CFCl=CF$_2$) and dichlorodifluoroethylene (CFCl=CFCl).

DETAILED DESCRIPTION OF THE INVENTION

In this invention, novel fluorochloro ionomers and their applications are disclosed. Fluorochloro ionomers means polymers containing significant amount of fluorine and chlorine atoms on the polymer backbone and carrying ionic groups (anionic or cationic) on the polymer pendant side chain. These fluorochloro ionomers are made by copolymerization of at least one fluorochloro monomer and at least one comonomer that carrying ionic group or carrying precursor group which can be converted to ionic groups.

The first preferred class of fluorochloro ionomers is perfluorochloro ionomers wherein the entire polymer backbone is substituted fully by fluorine and chlorine atoms and the polymer side chain carrying ionic groups. The perfluorochloro ionomers have (1) equivalent weight between 600 and 1500, preferably between 800 and 1200, and most preferably between 900 and 1100; (2) chlorine content between 8% and 30% by weight. The chlorine content can be determined by elemental analysis. The perfluorochloro ionomers are made by copolymerization of at least one perfluorochloro monomers and at least one functional monomers substantially fluorinated with at least one moiety that is ionic group or convertible to ionic groups. Example of perfluorochloro monomers includes, but not limited to, chlorotrifluoroethylene (CFCl=CF$_2$) and dichlorodifluoroethylene (CFCl=CFCl). Example of the functional monomers includes, but not limited to, compounds of the following molecular structure:

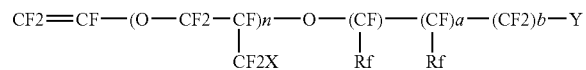

wherein X is F, Cl or mixtures; n is an integer 0, 1 or 2; R$_f$ is selected from F, Cl, perfluoroalkyl radical, and chloroperfluoroalkyl radical; a is an integer of 0 or 1; b is an integer of 1, 2, or 3. Y is a functional group convertible to an ionic group. Example of Y include, but not limited to, sulfonyl halide (—SO$_2$W); ester (—COOR); wherein W is F or Cl, and R is an alkyl group with carbon number from 1 to 12.

Functional group Y can be converted to certain ionic groups Z by chemical treatment. The resulting perfluorochloro ionomers have the following pendant side chain:

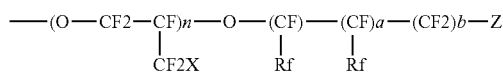

wherein X is F, Cl or mixtures; n is an integer 0, 1 or 2; R$_f$ is selected from F, Cl, perfluoroalkyl radical, and chloroperfluoroalkyl radical; a is an integer of 0 or 1; b is an integer of 1, 2, or 3. Z is a functional group with ionic character. Example of Z as an anionic group includes, but not limited to, sulfonic acid —SO$_3$H, or its salt form —SO$_3$M, sulfonamide —SO$_2$N(R)—, sulfonimide —SO$_2$N(R$_1$)—SO$_2$R$_2$, wherein R$_1$ and R$_2$ are alkyl or perfluoroalkyl group, carboxylic acid —COOH, or its salt form, —COOM, phosphonic acid —PO(OH)$_2$, and the like. Example of Z as an cationic group includes, but not limited to, sulfonamide amine —SO$_2$N(—R—)$_2$ NR, sulfonamide imidazole, sulfonamide quaternary amine, and the like.

The perfluorochloro ionomers are most suited for fuel cell applications, including hydrogen or methanol fuel cell applications. These ionomers are capable of being processed into thin films or membranes (from 5 micrometer thick to 200 micrometer) and are extremely well suited for low humidity or high temperature fuel cell applications and for breathable chemical protective covering materials. Here "breathable" means the protective covering allows sufficient moisture vapor permeability, which is important for the comfort of human body.

The second preferred class of fluorochloro ionomers is partially fluorochloro ionomers wherein polymer backbone is partially substituted by fluorine and chlorine atoms and the polymer side chain carrying ionic groups. The partially fluorochloro ionomers have (1) moisture vapor permeability rate>3000 gram H$_2$O/m$^2$/day (about ½ mil thick film); (2) chlorine content of between 10% and 39% by weight. The chlorine content can be determined by elemental analysis. These ionomers are suited for certain fuel cell applications but more suited for breathable protective covering materials. The partially fluorochloro ionomers are made by copolymerization of at least one fluorochloro monomer and at least one functional monomer carrying at least one moiety that is ionic group or convertible to ionic groups. Example of fluorochloro monomer includes, but not limited to, chlorotrifluoroethylene (CFCl=CF$_2$) and dichlorodifluoroethylene (CFCl=CFCl). Example of the functional monomer includes, but not limited to, acrylic acid, tert-butyl acrylate, methacrylic acid, maleic anhydride, maleic acid, itaconic acid, itaconic anhydride, styrene, methylstyrene, 2-acrylamido-2-methyl-1-propanesulfonic acid, vinyl sulfonic acid, vinyl phosphonic acid, allyl chloride, allyl bromide, vinyl imidazole, vinylpyridine, (3-acrylamidopropyl)trimethylammonium chloride, and the like. Other comonomers that can be used to enhance physical property of the partially fluorochloro ionomers are alkenes, including but not limited to ethylene, propylene, butylenes, and vinyl acetate and the like. When tert-butyl acrylate monomer is used, the tert-butyl group can be hydrolyzed by a base or thermally hydrolyzed into carboxylic acid group. When styrene or methylstyrene is used, the aromatic ring can be acidified by sulfur trioxide or concentrated sulfuric acid to create pendant sulfonic acid group onto aromatic ring. When ally chloride or ally bromide is used, the halide group can be converted to quaternary amine group by reacting with a tertiary amine. This is simply to demonstrate that some precursors which have no ionic character can be converted to ionic group by chemical treatment. These partially fluorochloro ionomers are capable of being processed into thin films or membranes (from 5 micrometer thick to 200 micrometer) and are extremely well suited for fuel cell applications and for breathable chemical protective covering applications.

To initiate copolymerization, the reaction can occur in an aqueous system or in a solvent system. When the functional comonomers are less water soluble, the copolymerization reaction is preferred to be in aqueous emulsions, mini-emulsions, or micro-emulsions. On the other hand, when the functional comonomers are more water soluble, it is preferred to use solvent system for copolymerization, wherein all monomers are soluble in the selected solvent system before polymerization. The temperature of copolymerization in either case is ranged from 0 to 150° C., preferably 40 to 100° C. Initiators for polymerization include free-radical initiators, such as persulfates, azo initiators, peroxides, or photo initiators, of which free radicals can be generated by heat, chemical, ultraviolet or gamma rays. Amount of initiators present can range between 0.01 and 3 percent by weight based on the final polymer content. The fluorochloro monomers are introduced to the reactor mostly from vapor phase. Sufficient mixing between liquid and vapor phases is important to encourage adequate mass transfer.

The product made from the copolymerization may be precursors of ion conducting polymers. Further chemical treatment is required to convert precursors to ionomers. Since most applications are for coating or extrusion, film formation quality is critical. It is possible to do the coating or extrusion application using precursor polymers or ionomers directly. Either coating or extrusion application would allow the ionomers to be processed into thin films, either alone or in composite forms with other porous substrates to form a composite membrane. The said other porous substrates can be a support of woven or non-woven porous material preferably microporous membranes, including but not limited to, microporous Nylon (polyamide), microporous polyvinylidene fluoride (PVDF), or microporous polytetrafluoroethylene (PTFE). The term "porous" means having a plurality of interconnected passages and pathways. Solutions of the ionomer can be impregnated into the porous support by methods known in the art, such as examples described in U.S. Pat. Nos. 5,547,551, 5,599,614, and 6,156,451.

In another aspect of this invention is the use of bipolar membrane, i.e. a double layers of membrane wherein each layer of ionomer has opposite charge to the other layer. This can be done by double coating or co-extrusion of two fluorochloro ionomers of opposite charged ionomers. For chlor-alkali industry application, this invented fluorochloro ionomers can be applied as double layers structure wherein one layer is fluorochloro sulfonic acid ionomer and the other layer is fluorochloro carboxylic acid ionomer. Such double layer membrane can be made by double coating or co-extrusion. Another aspect of this invention is to make one monolithic layer of fluorochloro sulfonyl fluoride membrane first, following by chemical treatment to convert one side of fluorochloro sulfonyl fluoride membrane into carboxylic acid membrane and the other side to become fluorochloro sulfonic acid membrane. This would avoid the traditional challenging need for laminating sulfonic acid and carboxylic acid membrane together for chlor-alkali industry application.

The following methods were used to characterize the fluorochloro ionomers prepared.

Degree of Hydration

A sample of 1 cm×1.5 cm in size was cut from a membrane and placed in a vacuum oven at 120° C. for 24 hours at about 60 mm Hg using a nitrogen bleed to maintain the pressure. Then, the sample was removed, and weighed when cool in 1 minute to obtain the dry weight. The sample was then placed in de-ionized water for 2 hours at 21~25° C. The sample was then removed from water, patted dry with a paper cloth, and immediately weighed to obtain the hydrated weight. The degree of hydration in percent is calculated as 100%×[Wt(wet)−Wt(dry)]/Wt(dry)

Three samples for each membrane were tested, and the reported hydration is the arithmetic mean of the three measurements.

Equivalent Weight

Equivalent weight determination is based on the method of WO 00/52060 PCT patent application.

Room Temperature Ionic Conductivity

The conductivity determination is based on the method of Doyle et al, WO 98/20573 PCT patent application.

Moisture Vapor Permeability Rate

Moisture vapor permeability rate determination is based on ASTM-E96-66BW test method. BW test is an inverted cup test, wherein water is in direct contact with each sample.

Chemical Agent Permeation Test

Chemical agent permeation rate determination is based on method described in U.S. Pat. No. 6,395,383.

EXAMPLES

The following examples illustrate specific embodiments of the present invention. It should be understood that the scope of the invention is not limited to these particular embodiments. The examples are briefly described as follows:

Example 1: the synthesis of copolymer of chlorotrifluoroethylene (CFCl=CF$_2$) and PSEPVE (CF$_2$=CFO—CF$_2$CF(CF$_3$)—O—CF$_2$CF$_2$—SO$_2$F). The resulting copolymer (1A) is further converted to sulfonic acid of perfluorochloro ionomers (1B), carboxylic acid of perfluorochloro ionomers (1C), sulfonamide amine of fluorochloro ionomers (1D), bi-layer of (1B)/(1C), composite membrane of (1B)/(1C), composite bipolar membrane of (1B)/(1D).

Example 2: the synthesis of copolymer of chlorotrifluoroethylene (CFCl=CF$_2$) and Tert-Butyl Acrylate. The resulting copolymer is further converted to carboxylic acid sodium salt partially fluorochloro ionomers.

Example 3: the synthesis of copolymer of chlorotrifluoroethylene (CFCl=CF$_2$) and maleic anhydride. The resulting copolymer is further converted to amide carboxylic acid ammonium salt partially fluorochloro ionomers.

Example 4: the synthesis of terpolymer of chlorotrifluoroethylene (CFCl=CF$_2$) and ethylene, and maleic anhydride. The resulting terpolymer is further converted to carboxylic acid potassium salt of partially fluorochloro ionomers.

Example 5: the synthesis of copolymer of chlorotrifluoroethylene (CFCl=CF$_2$) and acrylic acid. The resulting copolymer is converted to carboxylic acid sodium salt of partially fluorochloro ionomers.

Example 6: the synthesis of terpolymer of chlorotrifluoroethylene (CFCl=CF$_2$) and ethylene and acrylic acid. The resulting terpolymer is converted to carboxylic acid lithium salt of partially fluorochloro ionomers.

Example 7: the synthesis of copolymer of chlorotrifluoroethylene (CFCl=CF$_2$) and styrene. The resulting copolymer is further converted to sulfonic acid of partially fluorochloro ionomers.

Example 1

The Example 13 of U.S. Pat. No. 6,743,549 is repeated, except that vinylidene fluoride is replaced by chlorotrifluoroethylene (CFCl=CF$_2$). The resulting copolymer has the following structure:

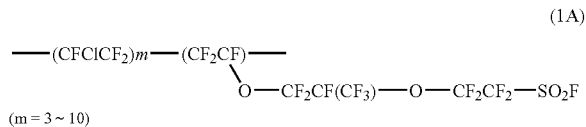

(1A)

Following the same example, some copolymer of (1A) is then converted to sulfonic acid lithium salt, which is suitable for electrolyte lithium batteries application. Using the acidification method taught in Example 1 of U.S. Pat. No. 6,156,451, the lithium salt of perfluorochloro ionomer is further acidified to sulfonic acid of perfluorochloro ionomers as follows:

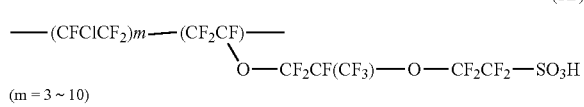

(1B)

(m = 3 ~ 10)

The sulfonic acid of perfluorochloro ionomers (1B) can form uniform thin film (after drying from 5 micrometer thick up to 200 micrometer) by removing volatile solvent in an hot air circulated oven at 160° C. for 3 minutes. Degree of hydration and chemical agent permeation rate of our invented perfluorochloro sulfonic acid ionomer membrane are all better than Nafion® perfluoro ionomer membrane when compared with that of similar equivalent weight, while ionic conductivity remains the same for the ionomers with similar equivalent weight. It shows that our perfluorochloro ionomers containing PCTFE polymer backbone surprisingly have superior barrier properties against organic permeation and better water management capability and stronger mechanical strength especially at wet environment than Nafion® type PTFE based perfluoro ionomers. The coated membrane with thickness of about 20 micrometer has moisture vapor permeability rate>3,000 gram m²/day. These unusual physical properties of our invented perfluorochloro ionomers are extremely suitable for various fuel cell applications and breathable protective covering.

Some copolymer (1A) is also converted to carboxylic acid perfluorochloro ionomers with the same chemical reaction methods taught by M. Seko, H. Miyauchi, J. Ohmura, and K. Kimoto, in "Modern Chlor-Alkali Technology (C. Jackson, ed.), Vol. 3, p. 76, Ellis Horwood, Chichester (1983). The resulting carboxylic acid perfluoro ionomers have the following structure:

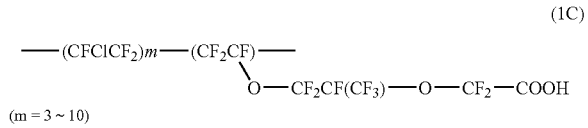

(1C)

(m = 3 ~ 10)

Some copolymer (1A) is also converted to cationic charge sulfonamide amine group by chemical reaction of (1A) with 1-methylpiperazine in dimethylformamide at 100° C. for 6 hours to form the following tertiary amine structure:

(1D)

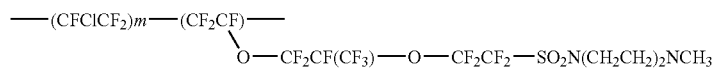

Additionally, copolymer (1A) is processed into thin film of about 2-mil thick. One side of (1A) is treated with the chemical method of (1B) and the other side is treated with the chemical method of (1C). The resulting membrane has one side of sulfonic acid perfluorochloro ionomer and the other side of carboxylic acid perfluorochloro ionomer. Such film with two layers of ionomers without lamination is very suitable for chlor-alkali industrial applications.

Furthermore, perfluorochloro ionomers with sulfonic acid group (1B) is coated onto one side of microporous 0.2 micron PVDF membrane (1½ mil thick) and the other side of the PVDF membrane is coated with perfluorochloro ionomers with carboxylic acid group (1C). The resulting composite membrane (1B)/(1C) is useful for chlor-alkali industrial application.

Finally, perfluorochloro ionomers with sulfonic acid group (1B) is coated onto one side of microporous 0.2 micron PVDF membrane (1½ mil thick) and the other side of the PVDF membrane is coated with perfluorochloro ionomers with sulfonamide amine group (1D). The resulting bipolar membrane (1B)/(1D) has moisture vapor permeability rate>3,000 gram/m²/day. The bipolar membrane has unusually low chemical agent permeability rate easily satisfying specifications and low methanol crossover rate, which shows the membrane is very useful for many industrial applications as well as breathable protective covering applications.

Examples 2

Example 1 of this invention is repeated, except that PSEPVE is replaced by tert-butyl acrylate. The copolymer is then treated with sodium hydroxide NaOH(aq) at 95° C. for 6 hours to obtain carboxylic acid sodium salt ionomers as follows:

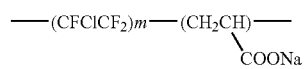

The partially fluorochloro ionomers are coated onto one side of microporous 0.2 micron Nylon membrane (about 2-mil thick) and dried at 130° C. for 2 minutes. The add-on weight to the microporous Nylon membrane is about 20 gram/m². This partially fluorochloro ionomer coating thickness is about ½ mil. The coated membrane has moisture vapor permeability rate>3,000 gram/m²/day. The coated membrane has low chemical agent permeability rate satisfying specifications, which means the invented fluorochloro ionomers have unusually good barrier properties for breathable protective covering applications.

Example 3

Example 6 of U.S. Pat. No. 6,228,963 is repeated, except that PPVE is not used and TFE is replaced by CTFE (Chlorotrifluoroethylene). The copolymer made is shown below:

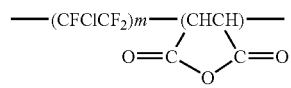

(m = 3 ~ 10)

The copolymer is further ionized by ammonia NH₄OH(aq) at 95° C. for 6 hours to become

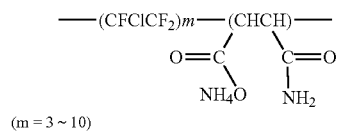

(m = 3 ~ 10)

Example 4

Example 6 of U.S. Pat. No. 6,228,963 is repeated, except that PPVE is replaced by ethylene and TFE is replaced by CTFE (Chlorotrifluoroethylene). The copolymer made is shown below:

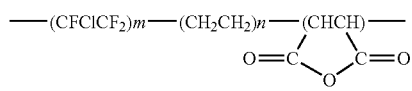

The copolymer is further ionized, with the method taught in Example 1 of U.S. Pat. No. 6,156,451, by potassium hydroxide KOH(aq) to become

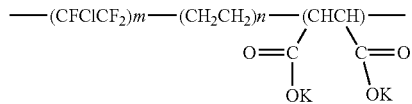

Example 5

Example 3 of this invention is repeated except that maleic anhydride is replaced by acrylic acid. The copolymer made is shown below:

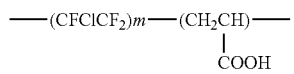

The copolymer is further ionized by NaOH(aq) at 95° C. for 6 hours to become sodium salt of carboxylic acid of fluorochloro ionomers.

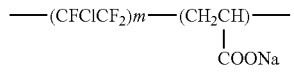

The partially fluorochloro ionomers are coated onto one side of microporous 0.2 micron Nylon membrane (about 2-mil thick) and dried at 130 C for 2 minutes. The add-on weight to the microporous Nylon membrane is about 16 gram/m². This partially fluorochloro ionomer coating thickness is about ½ mil. The coated membrane has moisture vapor permeability rate>3,000 gram/m²/day. The coated membrane has low chemical agent permeability rate satisfying specifications, which means the invented fluorochloro ionomers have unusually good barrier properties for breathable protective covering applications.

Example 6

Example 4 of this invention is repeated, except that maleic anhydride is replaced by acrylic acid. The copolymer is shown below:

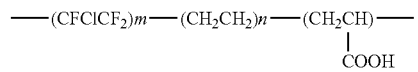

The copolymer is further ionized by LiOH(aq) at 100° C. for 6 hours to become

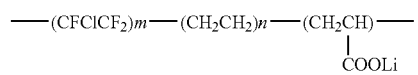

Example 7

Example 1 of U.S. Pat. No. 6,153,697 is repeated except that 785 grams CHHPM is replaced by 236 grams styrene and isobutylene is not used. The copolymer made is shown below:

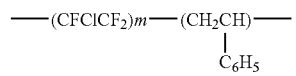

(m = 3 ~ 10)

The copolymer is further ionized by sulfur trioxide $SO_3$ at 110° C. for 6 hours to become sulfonic acid of fluorochloro ionomers.

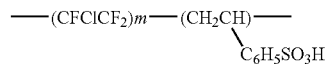

(m = 3 ~ 10)

The partially fluorochloro ionomers are coated onto one side of microporous 0.2 micron PVDF membrane (about 1½ mil thick) and dried at 130 C for 2 minutes. The add-on weight to the microporous PVDF membrane is about 18 gram/m². This partially fluorochloro ionomer coating thickness is about ½ mil. The coated membrane has moisture vapor permeability rate>3,000 gram/m²/day. The coated membrane has unusually low chemical agent permeability rate satisfying specifications, which means the invented fluorochloro ionomers have unusually good barrier properties for breathable protective covering applications.

I claim:

1. A multilayer membrane having thickness of 5-200 micrometer and being suitable for fuel cell applications and/or as a breathable protective covering wherein the membrane consists of at least two different types of perfluorochloro ionomers having an equivalent weight between 600 and 1500 and a chlorine content of 8-30 wt %.

2. The multi-layers membrane of claim 1 including (one layer of perfluorochloro ionomers with sulfonic acid group and another layer of perfluorochloro ionomers with carboxylic acid group) and/or (one layer of perfluorochloro ionomers with anionic charge group and one layer of perfluorochloro ionomers with cationic charge group).

* * * * *